US006859291B1

United States Patent
Katoh

(10) Patent No.: US 6,859,291 B1
(45) Date of Patent: Feb. 22, 2005

(54) INKJET TYPE COLOR IMAGE PROCESSING APPARATUS FOR TEXTILE PRINTING

(75) Inventor: Takayuki Katoh, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/536,051

(22) Filed: Mar. 27, 2000

(30) Foreign Application Priority Data

Mar. 30, 1999 (JP) ............................................ 11-088895

(51) Int. Cl.$^7$ .............................................. G06K 15/00
(52) U.S. Cl. ...................... 358/1.9; 358/2.1; 358/3.26; 358/3.31; 382/111
(58) Field of Search ........................... 358/1.9, 2.1, 1.3, 358/3.1, 3.11, 3.12, 3.26, 3.29, 3.31, 1.18, 3.32, 1.4, 3.24, 1.12, 501, 502, 401; 382/111; 101/3.1

(56) References Cited

U.S. PATENT DOCUMENTS

| | | | | |
|---|---|---|---|---|
| 4,141,849 A | * | 2/1979 | Hasegawa et al. | ..... 430/108.11 |
| 4,349,279 A | * | 9/1982 | Jung | ........................... 356/402 |
| 4,562,107 A | * | 12/1985 | Daniels | ....................... 428/196 |
| 5,574,664 A | * | 11/1996 | Feasey | ................... 364/571.07 |
| 5,992,963 A | * | 11/1999 | Miyake | ........................ 347/18 |
| 6,612,675 B1 | * | 9/2003 | Takahashi | ..................... 347/16 |
| 6,665,095 B1 | * | 12/2003 | Janssen | ....................... 358/2.1 |

FOREIGN PATENT DOCUMENTS

| | | | | |
|---|---|---|---|---|
| GB | 2147542 | * | 5/1985 | ............. B44F/1/00 |
| JP | 07-276673 | | 10/1995 | ............. B41J/3/04 |

* cited by examiner

Primary Examiner—Jerome Grant, II
(74) Attorney, Agent, or Firm—Frishauf, Holtz, Goodman & Chick, P.C.

(57) ABSTRACT

A textile printing apparatus is provided with an inputting device for inputting image data; a display to indicate an image based on the image data inputted by the inputting means; an image processing device for applying image processing to the image data so as to make colors of the image indicated on the display close to desired colors; and a printer to print the image on a fabric based on the image data applied with the image processing by the image processing means.

6 Claims, 6 Drawing Sheets

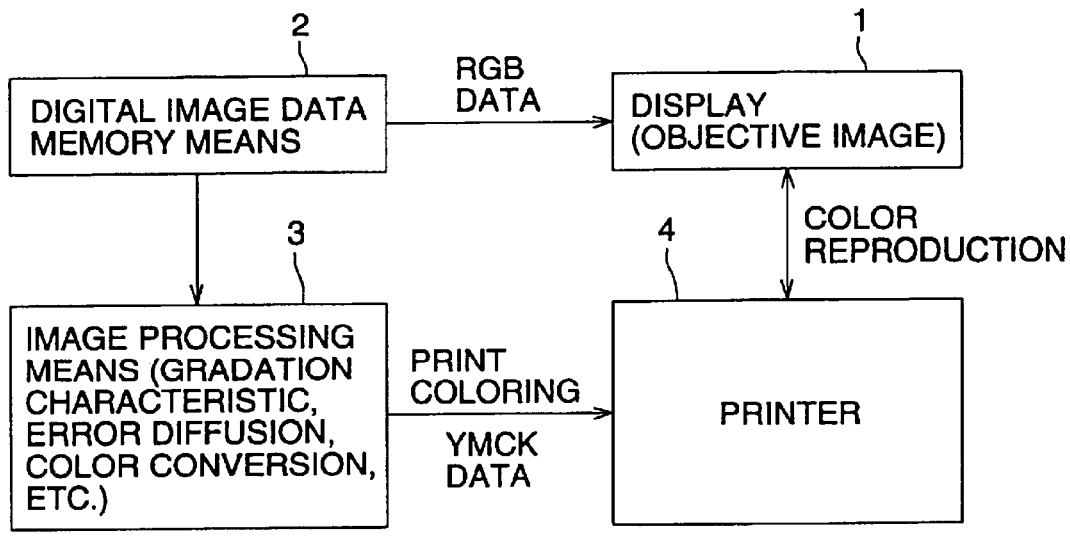
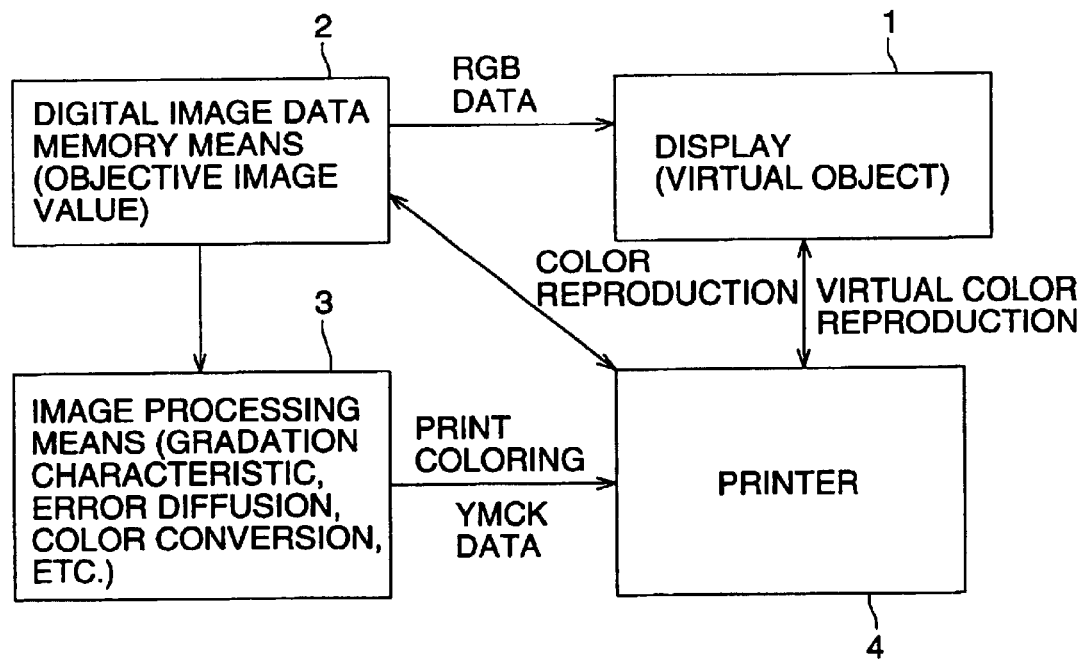

INKJET TYPE COLOR IMAGE PROCESSING APPARATUS FOR TEXTILE PRINTING

BACKGROUND OF THE INVENTION

The present invention relates to, for example, a color image processing technique for textile printing by which the ink of a plurality of colors is jetted to a fabric or a cloth by an inkjet system, and the fabric or the cloth is printed.

Recently, an inkjet type printing apparatus is rapidly spread as a printer for the industry, office, and personal use, because a color image of a digital image is easily obtained. Under such a condition, an application of an inkjet type printing apparatus to textile printing is expected.

Incidentally, as an typical example of the conventional textile printing, there is a silk screen textile printing method. This method is a method in which a screen print is produced, for an original image to be printed, for each color used in the original image, and the printing paste is directly transferred onto the fabric through the screen print and coloring is conducted. However, this method requires a large man-hours for producing the screen print for each color, and further, because it is necessary to produce by preparing dyes of the printing paste for each color used in the original image, although it is appropriate for the case where a large amount of fabric is printed once, there is a disadvantage that the cost per one product is relatively increased in the case where, for example, small lot fabrics are printed.

In contrast to such the conventional textile printing method, according to the inkjet type printing method, sources of the ink provided in the printing apparatus are controlled by a digital signal, and by mixedly impacting the small drops of ink onto the medium and forming them on the medium, an image can be directly formed. Accordingly, because the screen print or preparation of the printing paste for each color is not necessary, the man-hours can be largely reduced, thereby, this method has characteristics that low cost textile printing can be conducted also on small lot products.

Incidentally, the color formation using the inkjet is conducted by using a color management system inherent to a printing apparatus, and generally, its specification is not changed corresponding to a medium to be printed. This is for the reason that a general inkjet apparatus assumes the paper as the medium, and in the case of the paper, because characteristics such as the ink coloring property are not greatly different depending on the kind of the paper, the change of the specification is not particularly necessary.

On the one hand, recently, an inkjet type printing apparatus which can print for the medium such as OHP or glossy paper, whose characteristics are different from the plain paper, is also developed. However, as for also the OHP or the glossy paper, its characteristics are practically constant, and the other medium to be printed is not particularly assumed, therefore, in the above inkjet type printing apparatus, only the color management system correspond to a plurality of kinds of media which can be assumed is provided, and further, even in such system, it is considered that particularly, any problem does not occur.

However, according to the result of the investigation of the present inventor, it is found that, when the medium to be printed is fabrics, the coloring property of the ink is different depending on the diameter of a thread forming the fabrics or a knitting method of the thread, further, the diameter of a thread forming the thread or the number of the threads.

Further, there is a case where the material, in which the dyes are removed from the printing paste, is coated on the fabrics in order to prevent the bleeding, and in such the case, it is found that the coloring property of the ink is different depending also on its condition or the material forming the fabrics.

Further, in the textile printing, the coloring processing is conducted by adding heat or water by a heat roller or steamer, after printing, however, it is found that the coloring property is different depending also on its method or conditions.

In addition to that, at the last of the textile printing processes, after the coloring, superfluous materials are processed by adding surface active agents in the water or warm water, however, it is found that the coloring property is different depending also on this processing.

That is, in the case of printing by the inkjet type in which the conventional paper is the object, the specification of the printing may be set only for a plurality of kinds of media whose characteristics are previously known, however, it is found by the present inventor that, even when the printing is conducted by the inkjet type in the same specification on the fabrics sorted as the same kind such as the canvas fabric, the completed shade is largely changed by the pre-processing, condition of the fabrics, coloring method or conditions after printing, further, the removal process (hereinafter, called washing process) of unnecessary contents after coloring, etc.

Further, because the processing process determining the coloring property of the ink is inherent to the textile printing company in the textile printing industry, it is impossible to unify such the processing process. Accordingly, the real state is that, for each fabric produced by each company, various products whose characteristics are respectively different, appear on the market. On these products whose characteristics are different from each other, it is difficult to print with the same or approximate color, by the inkjet system with the same specification.

Such the disadvantage is not specifically actualized in the silk screen production method by the conventional technology. The reason is why, according to the silk screen production method, when the color is formed, the printing paste is prepared corresponding to the fabrics, that is, because the color is determined by being adjusted to the actual product, it is not necessary from the first to consider the characteristics of the fabrics. In contrast to this, in the case of the printing by the inkjet method, because the ink is mixed and a specific color is formed, for example, even when the mixing rate is constant, there is a fear that the different color is formed corresponding to the characteristics of the fabrics.

Accordingly, in Japanese Tokkaihei No. 7-276673, a method in which: a temporary conversion table to convert an image signal is previously set; the correction information for the temporary conversion table is calculated corresponding to the kind of the fabric; the temporary conversion table is corrected according to the correction information; and the image signal is converted according to the corrected temporary conversion table, is disclosed. However, by the above method, when the different kind fabric is printed, in the different kind fabric, it is difficult to make the color of the reproduced image coincide with each other.

On the one hand, even when the fabrics to be printed is previously known, because the setting of the printing specification of the inkjet system is a complicated operation accompanied by the data exchange, it is generally difficult to conduct such the operation by the operator side.

SUMMARY OF THE INVENTION

In view of such the problems of the conventional technology, an object of the present invention is to provide the textile printing technique by which the same or approximate color can be formed without accompanying the complicated operations, and without depending on characteristics of the fabrics.

The above object can be attained by the following structures.

(1-1) A textile printing apparatus, comprises:
- inputting means for inputting image data;
- a display to indicate an image based on the image data inputted by the inputting means;
- image processing means for applying image processing to the image data so as to make colors of the image indicated on the display close to desired colors; and
- a printer to print the image on a fabric based on the image data applied with the image processing by the image processing means.

(1-2) In the textile printing apparatus of (1-1), the image processing means applies a first color converting processing to the image data inputted by the inputting means in accordance with a kind of the fabric and indicates the image on the display based on the image data applied with the color converting processing,
- the image processing means applies a converting processing to the image data applied with the image processing by the image processing means in accordance with the kind of the fabric; and
- the printer prints the image on the fabric based on the image data applied with the converting processing.

(1-3) In the textile printing apparatus of (1-2), the textile printing apparatus further comprises:
- a memory to store a first color converting table to apply the first color converting processing and information to apply the converting processing,
wherein the image processing means applies the first color converting processing based on the first color converting table stored in the memory and applies the converting processing based on the information stored in the memory.

(1-4) In the textile printing apparatus of (1-3), the information includes at least one of an ejecting amount of a ink, a mixing ratio of different color inks and information regarding a density level of an ink, corresponding to the kind of the fabric.

(1-5) In the textile printing apparatus of (1-2), the image processing means applies the first converting processing to the image data inputted by the inputting means based on the first color converting table in accordance with the kind of the fabric.

(1-6) In the textile printing apparatus of (1-2), the converting processing is a second color converting processing in accordance with the kind of the fabric.

(1-7) In the textile printing apparatus of (1-3), the converting processing is a second color converting processing in accordance with the kind of the fabric and the information is a second color converting table to apply the second color converting processing.

(1-8) In the textile printing apparatus of (1-3), the memory stores the first color converting table for each kind of the fabric.

(1-9) In the textile printing apparatus of (1-3), the memory stores the second color converting table for each kind of the fabric. (1-10) In the textile printing apparatus of (1-7), the textile printing apparatus further comprises:
- transmitting means for transmitting color measurement data obtained by measuring color patch printed on the fabric by the printer; and
- receiving means for receiving the first color converting table to apply the first color converting processing and the information to apply the converting processing in accordance with the kind of the fabric,
wherein the image processing means applies the first color converting processing based on the first color converting table received by the receiving means and applies the converting processing based on the information received by the receiving means.

(1-11) In the textile printing apparatus of (1-10), the information includes at least one of an ejecting amount of an ink in accordance with the kind of the fabric, a ratio of mixing different color inks and information regarding a density level of an ink.

(1-12) In the textile printing apparatus of (1-10), at least one of the receiving by the receiving means and the transmitting by the transmitting means is conducted by using a public communication line.

(1-13) In the textile printing apparatus of (1-10), the converting processing is a second color converting processing in accordance with the kind of the fabric and the information is a second color converting table to apply the second color converting processing.

(1-14) In the textile printing apparatus of (1-10), the image processing means applies the first color converting processing based on the first color converting table in accordance with the kind of the fabric received by the receiving means.

(1-15) In the textile printing apparatus of (1-13), the image processing means applies the second color converting processing based on the second color converting table in accordance with the kind of the fabric received by the receiving means.

(1-16) In the textile printing apparatus of (1-1), the printer is an ink jet type printer.

(1-17) A textile printing data producing apparatus, comprises:
- receiving means for receiving data obtained by measuring colors of color patch formed by spraying plural different color inks for fabric to be printed;
- determining means for producing ink spraying data corresponding to a kind of fabric to be printed based on the received data; and
- transmitting means for transmitting the determined ink spraying data.

(1-18) In the textile printing data producing apparatus of (1-17), the ink spraying data includes at leas one of an ejecting amount of a ink, a mixing ratio of different color inks and information regarding a density level of an ink, corresponding to the kind of the fabric to be printed.

(1-19) In the textile printing data producing apparatus of (1-17), the determining means produces the ink spraying data by changing ink spraying data predetermined in accordance with a kind of fabric.

(1-20) In the textile printing data producing apparatus of (1-17), at least one of the receiving by the receiving means and the transmitting by the transmitting means is conducted by using a public communication line.

(1-21) In the textile printing-data producing apparatus of (1-17), the determining means produces a color conversion table corresponding to a kind of fabric as the ink spraying data.

(1-22) In the textile printing data producing apparatus of (1-17), the printer is an ink jet type printer.

(1-23) A textile printing method, comprises steps of
- inputting image data;
- applying color converting processing to the image data based on a color conversion table corresponding to a kind of desired fabric.

(1-2.4) In the textile printing method of (1-23), the textile printing method further comprises a step of selecting a color conversion table in accordance with a kind of desired fabric, wherein in the step of applying color converting processing, the color converting processing is applied to the image data based on the selected color conversion table.

(1-25) In the textile printing method of (1-23), the textile printing method further comprises a step of producing a color conversion table corresponding to a kind of desired fabric, wherein in the step of applying color converting processing, the color converting processing is applied to the image data based on the produced color conversion table.

The preferable structures will be described below.

(2-1) A digital image processing method in which the second image processing is conduct prior to the other, when the first image processing to convert the digital image data so as to coincide with or correspond to the approximate color to the color displayed on a display, and the second image processing to convert the digital image data so as to coincide with or correspond to the approximate color to the color of the final print obtained through the textile printing processes to conduct printing, coloring, and washing, are provided. According to this structure, in the final print, a color which coincides with the desired color or a color which is more approximate to the desired color, can be expressed.

(2-2) A textile printing method in which the plurality of colors of ink are jetted onto the fabric according to the color conversion table, and an image is formed on the fabric, and which has a process to change the content of the color conversion table corresponding to the kind of the fabric to be printed. This structure is characterized in that the set one color conversion table is not used by correcting it corresponding to the kind of fabrics, but the color conversion table corresponding to the kind of fabrics is made. According to this structure, the high quality textile printing can be conducted. Further, it is preferable that, for example, the color conversion table is made for each kind of fabric. For example, in the color conversion table, when a jetting amount of the ink is regulated when a specific color is printed, by changing the content of the color conversion table, the same or approximate color can be formed on an arbitrary kind of fabrics. Incidentally, the kind of fabrics used herein, means the fabrics in which the diameter of the thread forming the fabrics or knitting method, and further, the diameter of the thread forming the thread or the number of threads, are different with each other. When the material of the thread is different, it is necessary to change the kind of ink for textile-printing. For example, in the case of a dispersive dye, polyester and acetate are preferable, in the case of a reactive dye, cotton, jute, and rayon are preferable, and in the case of an acid dye, silk, nylon, and wool are preferable. As described above, when more than two kinds of materials can be printed, it comes in the concept of the kind of fabrics.

(2-3) A textile printing method by which the plurality of colors of ink are jetted onto the fabric and an image is formed on the fabric, and by which at least one of a jetting amount of the ink and a ratio to mix different colors of ink is changed corresponding to the kind of the fabric to be printed. According to this method, also in the different kinds of fabrics, the same or approximate color can be formed, thereby, the high quality textile printing can be conducted. Incidentally, in Japanese Tokkaihei No. 6-69432, the description that the operator himself gives the information to limit the maximum hitting amount of the ink to the main body, is disclosed, however, in this case, the experience of the operator is necessary. The method of the present invention in which at least one of a jetting amount of the ink and a ratio to mix different colors of ink is changed, means that the data of at least one of a jetting amount of the ink and a ratio to mix different colors of ink, is built in the color conversion table. However, according to the present textile printing method, it is not necessary that the operator adjusts the jetting amount by himself, and it can be automatically adjusted. Incidentally, it is preferable that, when the color conversion table is made, the data of at least one of a jetting amount of the ink and a ratio to mix different colors of ink, is automatically built in the color conversion table.

(2-4) A method of (2-2) or (2-3) in which the ink is jetted onto the fabric by the inkjet system. That is, the above method of (2-2) or (2-3) is particularly appropriate for the textile printing by the inkjet system.

(2-5) A color conversion table generating method for converting the color to be printed for each different kind of fabrics, which has a process to find a gradation curve of the ink in the case where the fabric is printed by using more than 1 kind of ink including at least black, a process to measure the colors of different colors of at least more than 7 kinds of color patches printed on the fabric by using the ink, and a process for generating the color conversion table for each kind of fabrics according to the gradation curve of the ink and the measured colors of the color patches. According to this method, when the color conversion table to regulate, for example, the jetting amount of the ink for each of kinds of the fabrics is made, only by appropriately select the color conversion table corresponding to the kind of the fabric to be printed, the desired color can be reproduced in the fabric, thereby, the high quality textile printing can be conducted. It is specifically preferable that the colors of color patches of at least more than 312 kinds of different colors are measured.

(2-6) A color conversion table generating method for conversing the color to be printed for each different kind of fabrics, which has a process to measure each of color density of the ink of different density, a process to find a gradation curve of the ink in the case where the fabric is printed by using more than 1 kind of ink including at least black, a process to measure the colors of different colors of at least more than 7 kinds of color patches printed on the fabric by using the ink, and a process for generating the color conversion table according to the measured color density of the ink, the gradation curve of the ink and the measured colors of the color patches. According to this method, when the color conversion table to regulate, for example, the jetting amount of the ink for each of kinds of the fabrics is made, only by appropriately select the color conversion table corresponding to the kind of the fabric to be printed, the desired color can be reproduced in the fabric, thereby, the high quality textile printing can be conducted. Incidentally, a process to measure each of color density of the ink of different density, means a process in which printing is conducted on the fabrics without passing through the color management, and coloring, washing, and measuring the color density after drying, are conducted. It is specifically preferable that the colors of color patches of at least more than 312 kinds of different colors are measured.

(2-7) A method of (2-5) or (2-6) in which the ink is jetted onto the fabric by the inkjet system. That is, the above method of (2-5) or (2-6) is particularly appropriate for the textile printing by the inkjet system.

(2-8) A textile printing data generating apparatus having a receiving means for receiving the data which measures the color of the color patch formed by jetting the plurality of colors of ink onto the fabrics to be printed, a determining means for generating the ink jetting data corresponding to the kind of fabrics to be printed according to the received data, and a transmitting means for transmitting the determined ink jetting data. Thereby, for example, the operator forms the color patch on the desired fabric to be printed, and by only transmitting the data which measures the color of the color patch, the operator can receive the ink jetting data which is formed and transmitted by the textile printing data generating apparatus, and by using the ink jetting data, the desired color can be reproduced on the desired fabric.

(2-9) The textile printing data generating apparatus according to (2-8), wherein the ink jetting data includes at least an amount of ink jetting, a mixing rate of the different colored ink, and the information of light and shada of the ink, which are appropriate for the kind of fabric to be printed.

(2-10) The textile printing data generating apparatus according to (2-8) or (2-9), wherein the determining means forms the ink jetting data by changing the ink jetting data previously determined corresponding to a specific kind of fabric. According to this, it is preferable because such the formation can be quickly conducted.

(2-11) The textile printing data generating apparatus according to any one of (2-8) through (2-10), wherein at least one of the receiving of the receiving means and the transmission of the transmitting means is conducted by using the public line. According to this, it is preferable because the transmission or the receiving can be quickly conducted.

(2-12) A method of one of (2-8) to (2-11) in which the ink is jetted onto the fabric by the inkjet system. That is, any one of the above methods of (2-8) to (2-11) is appropriate for the textile printing by the inkjet system.

(2-13) A textile printing method by which a desired color is formed on different kinds of fabrics by textile-printing, which having a process by which a color chart in which the digital data of the color is known, is printed on the fabric by using a virtual color conversion table, coloring is conducted, and superfluous dyes are removed, a process by which a desired color is selected from the color chart, and a process by which the color data of the digital image data which is desired to be printed is converted into the digital data which is approximate to or coincides with the digital data of the desired color. According to this, the operator can easily print the desired color on the fabric on which the textile printing is desired, without changing the color conversion table.

(2-14) The textile printing method according to (2-13), wherein the number of color charts in the color chart in which the digital data of the color is known, is preferably not smaller than 700 and not larger than 3000.

(2-15) The textile printing method according to (2-14), wherein, because, generally, the discrimination ability of the human eyes becomes low for the bright color and dark color, when the digital data in the color chart in which the digital data of the color is known, is regulated by RGB, and the gradation is divided into 0 to 255 signals, the range of the data of 0 to 100 and/or 200 to 255, is formed by the signal whose interval is larger than in the other range. According to this, the high quality textile printing which is preferably color-reproduced corresponding to the characteristics of the human eyes, can be conducted.

(2-16) The textile printing method according to (2-15) is preferable, in which the range of the data of 0 to 100 and/or 200 to 255 is formed of the signals whose interval is not smaller than 20, and the other range is formed of the signals whose interval is not larger than 15.

(2-17) The textile printing method according to (2-13) is preferable, in which, in the color chart in which the digital data of the color is known, the digital data is regulated by Lab, and the L value is in the range of 0 to 100, and the range of the value of 0 to 30 is formed of the values whose interval is not smaller than 10, and the a value and/or b value is regulated by the range of −120 to 120, and is formed of the values whose interval is not smaller than 20.

(2-18) A textile printing apparatus having a function by which the maximum amount of ink jetted per unit area is controlled. Setting corresponding to the kind of fabrics can be conducted such that, for the kind of fabrics having the large ink absorptivity such as, for example, the canvas fabric, the maximum ink amount is set high, thereby, the high quality textile printing can be conducted. Incidentally, the maximum amount of jetted ink may be the maximum amount of the ink adhered to the fabrics. Further, it is preferable to realize the apparatus of (2-15) by including the information for adjusting the maximum amount of the ink jetted per unit area in the color conversion table. According to this, it is not necessary for the operator to adjust the amount of jetting by himself, but it can be automatically adjusted. Further, in the case where the color conversion table is made, when the information to adjust the maximum amount of ink jetted per unit area is automatically included, the efficiency of the operation can be increased.

(2-19) The textile printing apparatus according to (2-18), wherein, when the maximum amount of ink is adjusted, a $\Delta E$ value is not larger than 3 as compared to the case where the maximum amount of ink is not adjusted. According to this, it is preferable because there is no difference when the color is viewed by the human eyes.

(2-20) The textile printing apparatus according to (2-18) or (2-19) is preferable, in which a generating means for founding the gradation curve calculated from the adjusted maximum amount of ink, and for generating the color conversion table to be printed, from the gradation curve corresponding to different kinds of fabrics, is provided.

(2-21) A method of any one of (2-18) to (2-20) is preferable, in which the maximum amount of the ink is determined based on a bleeding amount of ink jetted in the fabric to be printed.

(2-22) A method of any one of (2-19) to (2-21) in which the ink is jetted onto the fabric by the inkjet system. That is, the above method of any one of (2-19) to (2-21) is particularly appropriate for the textile printing by the inkjet system.

(2-23) A textile printing apparatus having a display means for displaying an image according to the digital data, a processing means for conducting the image processing on the digital image data so that the color of the image displayed by the display means comes close to the desired color, and a print means for printing the image on a predetermined fabric according to the digital data which is image processed. According to this, for example, the operator confirms the color of the image displayed on the display as a display means, according to the digital image data, thereby, the operator can forecast the color after textile-printing to some extent, without actually conducting the textile printing composed of a plurality of processes such as a coloring process.

(2-24) A textile printing apparatus having a display means for displaying the first information relating to the color of the image according to the digital image data, an acquiring means for acquiring the second information relating to the color of the image printed on a predetermined fabric according to the digital image data, and a changing means for changing the first information according to the second information so that a desired color can be formed in the image. According to this, the RGB value or Lab value (the first information), for example, displayed on the display can be changed according to the calorimetric data (the second information) of the color printed on a predetermined fabric, thereby, the desired color can be formed on a predetermined fabric.

(2-25) A textile printing apparatus having a display means for displaying the first information relating to the color of the image according to the digital image data, an acquiring means for acquiring the second information relating to the color of the image printed on a predetermined fabric according to the digital image data, and a changing means for changing the second information according to the first information so that a predetermined color can be formed in the image. According to this, the colorimetric data (the second information) of the color printed on a predetermined fabric, can be changed according to the RGB value or Lab value (the first information), for example, displayed on the display, thereby, the desired color can be formed on a predetermined fabric.

(2-26) Incidentally, when a program to execute the above-described digital image conversion method according to (2-1), textile printing method according to any one of (2-2) to (2-4), color conversion table generating method according to any one of (2-5) to (2-7), or textile printing method of any one of (2-13) to (2-17), is recorded in a recording medium such as the CD, FD, or DVD, it is preferable because the program can be read out at need.

BRIEF DESCRIPTION OF THE DRAWINGS

FIG. 1 is a block diagram showing a system to conduct the first method.

FIG. 2 is a block diagram showing a system to conduct the second method.

DETAILED DESCRIPTION OF THE PREFERRED EMBODIMENT

Figure 3:
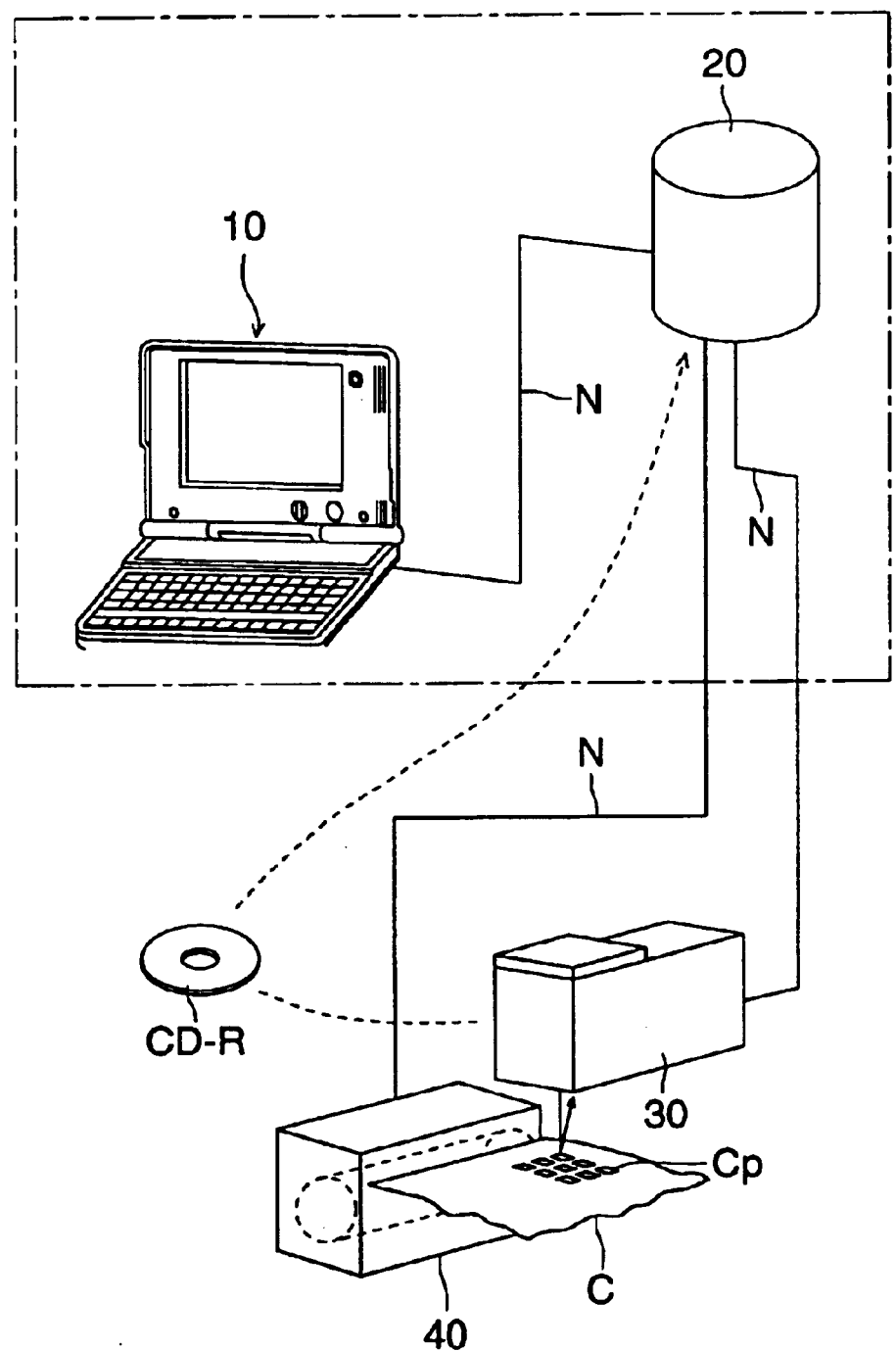
FIGS. 3(a) and 3(b) are conceptual views of a color conversion system according to an embodiment of the present invention.
Figure 3:
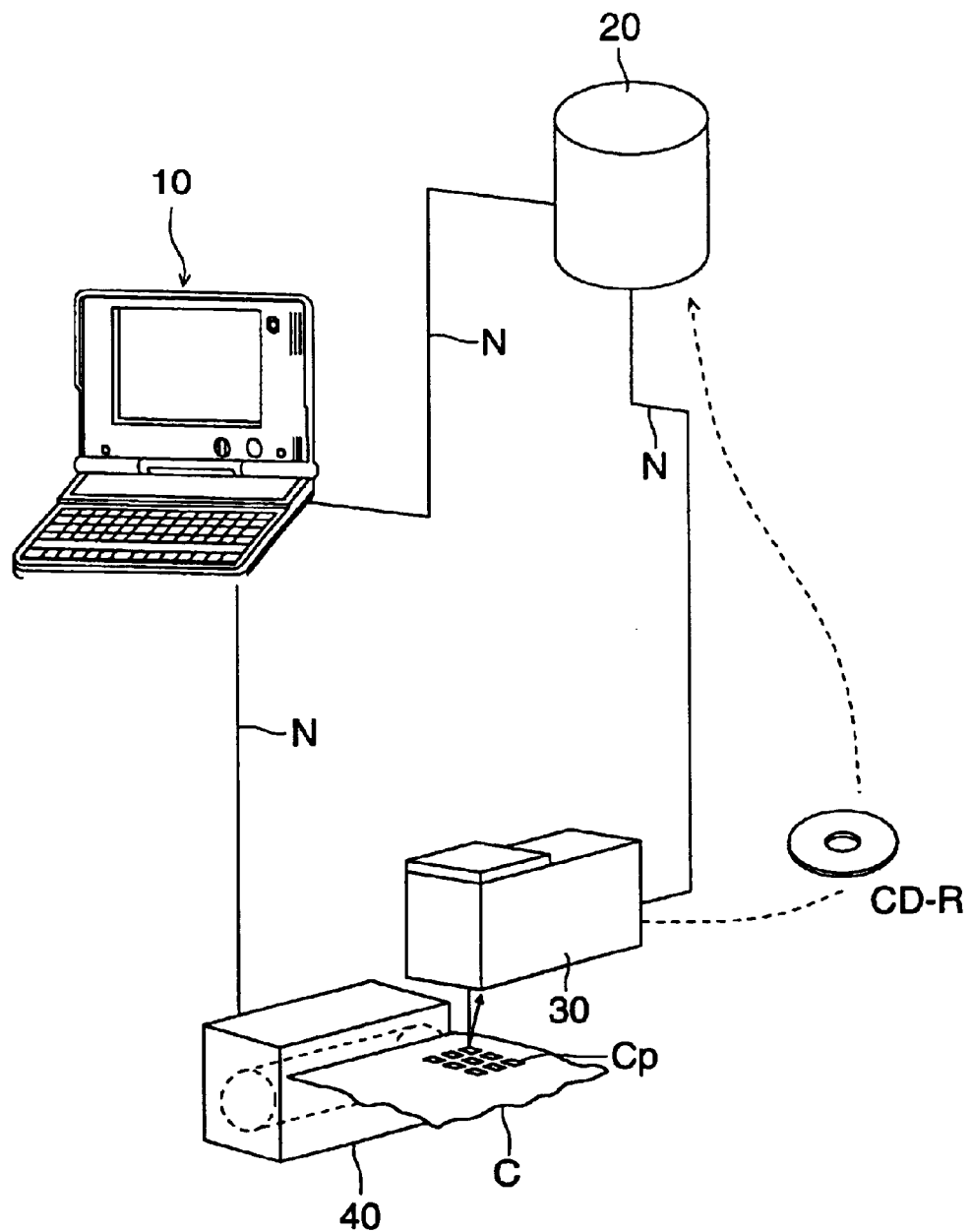

Referring to embodiments, the present invention will be described below. Initially, when textile printing is conducted on the fabrics, processes in which pre-processing is conducted on the fabrics, an image is printed thereon by an inkjet system, fixing (coloring) processing is conducted, and further, the superfluous ink is removed by washing processing, are passed through.

Incidentally, the feature of the textile printing by the inkjet system is not that dyes are specifically prepared for each fabric to be printed as the conventional screen method, but that, previously, a plurality of colors of ink is prepared, and by adjusting a jetting amount of the ink and a mixing rate, various colors are formed. Incidentally, in the inkjet system according to the present embodiment, total 8 kinds of colors are used respectively for light and shade of 4 colors of yellow, magenta, cyan, and black.

However, because the absorptivity of the ink is different for each fabric, even though, for example, in some kind of fabric, the bright color is expressed by the mixed ink, there is a case where the dark color is expressed in another kind of fabric in the same conditions. In the clothing, there is a case where it is desired to arrange the same pattern on the different kind of fabrics such as, for example, neck ties or handkerchiefs, however, there exists the real situation in which it is not preferable that the color is different for each kind of fabrics.

Accordingly, in the present embodiment, a method in which, even when the kind of fabrics is different, the same or the approximate color can be formed, is proposed. Initially, the adjustment method of the color of the image when the print is conducted on the subject to be printed according to the image data, will be described. In such the method, there are two modes. Initially, the first method is a method in which, in the presupposition that an electric signal as the digital image data exists, the color displayed on the display is confirmed.

FIG. 1 is a block diagram showing a system to execute the first method. As shown in FIG. 1, the digital image data is converted into the RGB data according to the data read from a digital image data storing means, and an image based on the RGB data is displayed on a display 1. The color of the image displayed on the display is changed by using an image processing means 3 so that it becomes an objective color (the color of the final print things through a finish processing process such as coloring and washing). For example, when the color is not the desired color, processing of the gradation characteristic conversion, error conversion, and color conversion, is conducted by using an image processing means 3 so that the desired color is obtained. Incidentally, in such the case, the RGB data is converted into the corresponding YMCK data.

The image data after conversion (YMCK data) is transmitted from the image processing means 3 to an ink-jet system printer 4, and the print can be conducted on the desired fabric by the printer 4. After that, fixing processing and washing processing are conducted.

A feature of this method is that the image can be expressed once by the display 1, therefore, the result of the finish of the final print things can be easily and quickly forecast on the display 1 without passing through the coloring process which is specific to the textile printing, (generally, in the textile printing, the shade is greatly different before and after the coloring).

Incidentally, in the present embodiment, the color on the display 1 approximately coincides with the color on the textile-processed object (the object through fixing processing and washing processing). Further, the color conversion table (for example, in the form of Look Up Table (LUT)) for converting the RGB data into the YMCK data, is stored in the image processing means 3 for each kind of the fabrics, and the image processing means converts the RGB data into the YMCK data by using the color conversion table corresponding to the kind of the fabrics, and transmits to the printer 4. In this case, when the gradation characteristic conversion, error diffusion, and color conversion are conducted by the image processing means 3, the RGB data after the conversion is converted into the YMCK data. As described above, when the color conversion table is previously stored for each kind of the fabric, the operator can easily and quickly forecast the result of the finish of the final print things on the display without passing through the coloring process which is specific to the textile printing. Incidentally, the generating method of the color conversion table corresponding to the kind of the fabrics will be described later.

Incidentally, the method to change the color conversion table for changing the color conversion system according to the kind of the fabric, is only to change mainly the assumed portion of the calorimetric color characteristic of the image processing. That is, "changing the color conversion system" means that, as described above, the color conversion table for making the RGB data or the LAB data relate to the CMYK data, is changed according to the kind of the fabrics.

A sequence to change the color conversion system (sequence of generating the color conversion table corresponding to the kind of fabrics) will be detailed. In the present embodiment, the color conversion system in the case where the ink of the YMCK and the other colors is used, is made different from that of the case of the ink in which the YMCK and its respective density is different (low density level ink and high density level ink of the YMCK).

<The Case Where the Ink of the YMCK and the Other Colors is Used>

Initially, the gradation curve of each color is found. In this case, when at least the gradation curve of black is found, even though the gradation curves of the other colors are not found, the fine color conversion can be conducted by the color conversion table made of the colorimetric data of the color patch, which will be described later, and the method by Lagrange's interpolation. As the method of the gradation curve, for example when each color data is 8 bits, 256 gradations are expressed, however, it is not necessary to sample the data of 256 points for each color, but the gradation curve may be approximated by the points of at least not smaller than 3 points with different density (the amount of data is different). Next, the color patch, which will be described later, is printed on the desired fabric by using the gradation curve, and finishing processing (coloring and washing) is conducted, and the color patch is completed. The colorimetry is conducted on the color patch, and a LUT is generated by the LUT generating program.

<The Case Where the Ink in Which the YMCK and its Respective Density are Different, is Used>

Initially, the colorimetry is conducted on the colors after the print is conducted on the desired fabric by each of the ink whose density is different, and finishing processing is conducted. A switching point of the deep-colored ink and light-colored ink for each color is calculated, according to the color density after finishing processing of the deep color and the light color of each color and the color density of the medium. Next, the gradation curve of each color is found by using this data. Also in this case, as described above, at least the gradation curve of black may be found. However, different from the above description, the gradation curve based on 3 points is not good in the approximation, and the approximation in at least not smaller than 10 points is preferable. Further, by using this gradation curve, in the same manner as the above description, the color patch is completed, and the colorimetry is conducted, and a LUT is generated by the LUT generating program. Incidentally, in the case where each light and shade ink of the YMCK and the ink of the color other than the YMCK are used, for the light and shade ink, it is preferable that the LUT is generated in the same manner as in <The case where the ink in which the YMCK and its respective density are different, is used>.

Figure 4:
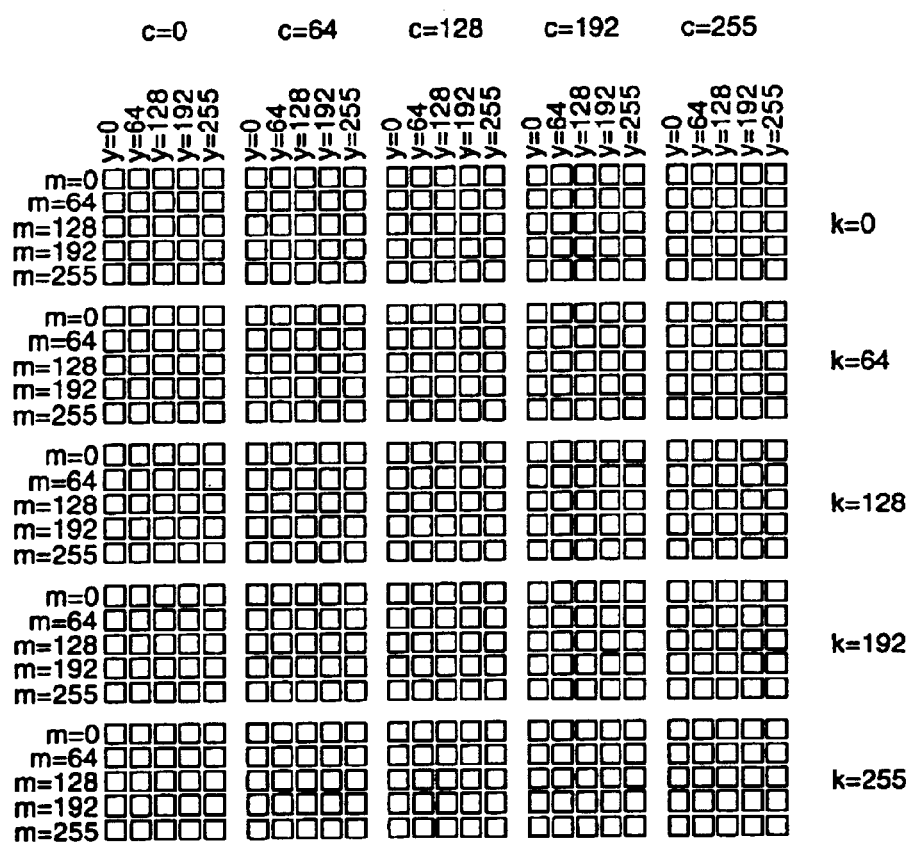
FIG. 4 is a view showing an example of a color patch.

FIG. 4 is a view showing an example of the color patch on which the colorimetry is conducted. The case where the YMCK and its each density are different, will be described. As shown in FIG. 4, the color patch is formed of total 25 groups each of which is formed of 25 color samples, that is, structured by 625 color samples. These groups are structured by 5 rows in lateral direction from c=0 to c=255. Herein, c=0 means that the ink jetting amount of cyan is zero %, and c=255 means that the ink jetting amount of cyan is 100%.

Further, these group is structured by 5 lines in the longitudinal direction from k=0, to k=255. Herein, k=0 means that the ink jetting amount of black is zero % and k means that the ink jetting amount of black is 100%.

On the one hand, each group is structured by color samples of 5 rows in the lateral direction from y=0 to y=255. Herein, y=0 means that the ink jetting amount of yellow is zero %, and y=255 means that the ink jetting amount of yellow is 100%.

Further, each group is structured by color samples of 5 lines in the longitudinal direction from m=0 to m=255. Herein, m=0 means that the ink jetting amount of magenta is zero %, and m=255 means that the ink jetting amount of magenta is 100%.

That is, the color patch shown in FIG. 4 is formed by changing the jetting amount of the ink of each color of yellow, magenta, cyan, and black respectively in 5 steps, and a condition that the jetting amount and the mixing ratio of these ink are changed form y=m=c=k=0 to y=m=c=k=255 and printed, is shown. It is more preferable that the number of color patches is at least not smaller than 7, and not smaller than 312. Particularly, in not smaller than 312, the reproducibility of the color is greatly increased.

Next, the color patch in the case where the YMCK and the color other than it are used, will be described. For example, when the color of the YMCKBGR is used, the same color patches are generated for 3 kinds of YRM and K, MBC and K, and CGY and K. That is, in the case of the YRM and K, the C value in FIG. 4 may be changed to R. As described above, the LUT is generated.

Next, the textile printing data generating apparatus will be described.

FIG. 3 is a schematic diagram of color converting system according to the embodiment of the present invention. In FIG. 3, a host computer can reproduces colors finally obtained on a specific fabric by the textile printing. Data of an jetting amount of each ink and a mixing ratio of inks are stored as a new LUT.

Further, the LUT generating program to generate the LUT is assembled. A portion enclosed with a broken line may be an integrated personal computer. Alternatively, only the LUT generating program is assembled in a host computer 20, and the LUT may be assembled in the personal computer 10. The operator actually textile-prints a color patch Cp on the fabric C to be desired for textile-printing, (the fabric may be the known fabric or the unknown fabric), by using an inkjet type printer 40. Herein, the textile printing product is a product obtained by textile printing process in which printing is conducted and after that, finishing processing is conducted. In this case, because the absorptive amount of the ink is different corresponding to the diameter of the thread from which the fabric is woven, the actual color of the color patch is also different.

Accordingly, the operator conducts colorimetry on each of the color patch by a colorimetry apparatus (for example, the apparatus made by X-RITE co.) and sends the data to the host computer 20 through the public line N or a recording medium such as a CD-R.

Figure 5:
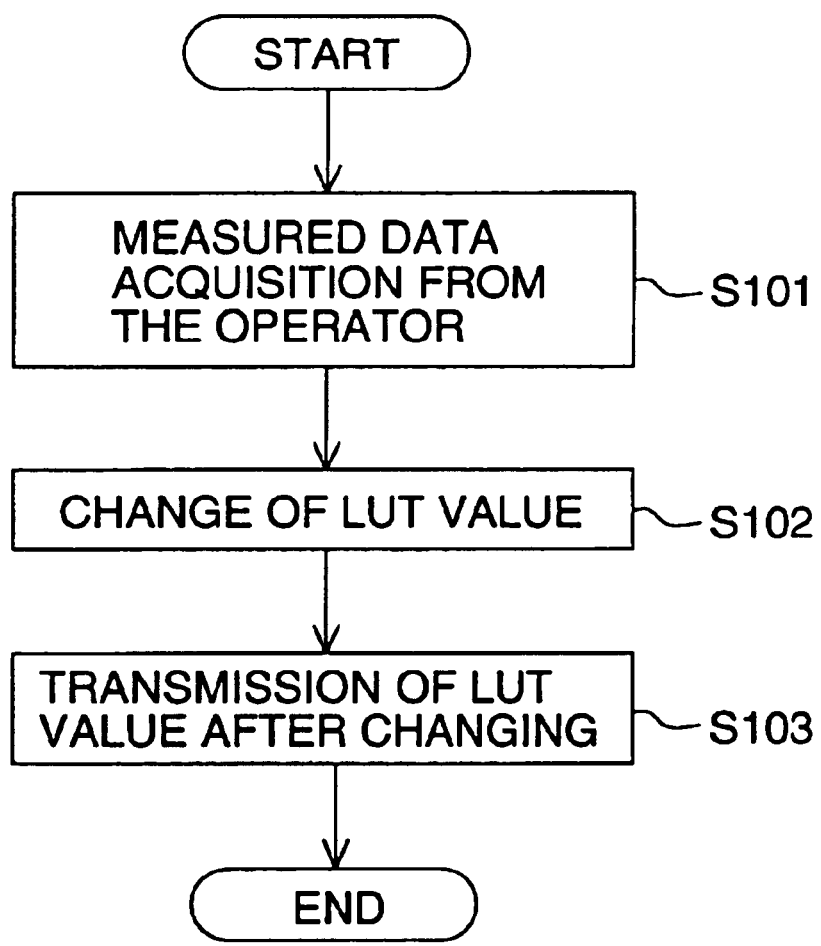
FIG. 5 is a flow chart showing operations in a host computer 20.

FIG. 5 is a flow chart showing operations in the host computer 20. In step S101, the host computer 20 acquires the calorimetric data from the operator. In next step S102, the host computer 20 generates the LUT for the fabric C according to the acquired data.

Herein, the jetting amount and mixing rate of the ink can be made correspondence to the color actually printed on the desired fabric C of the operator. Accordingly, the host computer 20 customizes the LUT in such a manner that the LUT is appropriate for the desired fabric C while appropriately changing the LUT value by using, for example, the personal computer 10 as the terminal equipment. The intermediate value (for example, c=32) may be found by Lagrange's interpolation or the linear interpolation. In this case, in the case of YMCK, when the number of color patches is not smaller than 312, the color reproducibility is better. Incidentally, such the conversion can also be automatically conducted by an arbitrary software.

Further, in step S103, the host computer 20 transmits the generated LUT values to the printer 40 through the public line N. The operator can form a image of the desired color on the fabric on which the textile printing is desired.

When only the LUT generating program is assembled in the host computer 20 and the LUT is assembled in the personal computer, the structure is as shown in FIG. 3(b). Colorimetry is conducted on each of the color patchs Cp, and the data is sent to the host computer through the public communication line N or the recording medium such as the CD-R. The LUT is generated by the flow of the above-described flow chart. The generated LUT data is transmitted to the personal computer 10. The operator starts the printer 40 by the personal computer 10, and the image of the desired color can be formed on the fabric.

In the actual color conversion of the image, the calculation of various steps is required for the conversion, however, in the present embodiment, by only changing the content of the LUT, the color conversion for each fabric is easily conducted.

Further, as described above, in order to make the LUT, essentially, the calculation of the colorimetric data is required, however, in the present embodiment, although each operator conducts up to the colorimetry of the fabric, the data is transferred to the host computer 20 by using the communication function, and the calculation can be conducted there, thereby, the calculation for the color conversion can be easily and at low cost even when each customer has not an expensive computer. Further, on the side of the host computer 20, it does not acquire the information-for the fabric (for example, the processing peculiar to the customer), and can propose the information for the color conversion, which is convenient.

Further, the second method shown in FIG. 2 is that, initially, the digital image data is made to virtually coincide with the display 1, and finally, the calorimetric data of the objective fabric for the textile printing is made to coincide with the color data of the digital image data. For example, although Photshop (made by adobe Co.) is the digital image data having no definition, it can virtually display Lab value. When this virtual value is made to coincide with the colorimetric data (Lab value) of the final print things, the desired color can be expressed. For example, the Lab value which is the virtual value of the image data read from, for example, the digital image data memory means 2, is displayed on the display 1. Then, the Lab value of the image data is converted by the image processing means 3 so that the virtual Lab value of the image data is the same as the true Lab value. Then, the YMCK data based on the image processing means 3 is transmitted to the printer 4, and printed on the desired fabric by the printer 4.

According to the present embodiment, the color of the image on the display 1 is somewhat different from the color of the final print image, however, because the print things can be made to coincide with the Lab value, the operator can confirm the actual color by using the other means (for example, a color chip table made by Scotdic Co.).

Further, the 3rd method is that the virtual LUT, which is the virtual color conversion table, is generated and fixed, and when the virtual RGB or Lab data on the digital image data side is changed, the color conversion can be attained. For example, when there is a fabric on which the operator wants to textile-prints, initially, the color chart in which individual digital image data (for example, the RGB value) is known, is printed on this fabric by the ink-jet apparatus by using the virtual color conversion table, and coloring and washing are conducted, and the color chart (color sample) is generated. Next, the operator selects the desired color from the color samples. Then, the operator obtains the digital image data (for example, the RGB value) of this color. Then, the operator pastes this digital image data on the data (color) of the image to be designed (which is printed). That is, the image data for textile-printing is changed to the digital image data such as the Lab value of the desired color, on the color chart. According to this, the operator can easily textile-print the desired color onto the fabric on which textile-printing is desired, without changing the color conversion table.

According to this, the LUT (color conversion table) generation corresponding to the kind of fabric or the colorimetry is not necessary, and the virtual value of the RGB or Lab is inputted according to the true color (human eyes) obtained by the color chart, and the color can be reproduced, thereby, the time and the man-hour can be greatly reduced.

The number of color charts in the color chart in which the digital data of the color is known, is better when it is set to not smaller than 600, preferably not smaller than 700 and not larger than 3000. Herein, the color chart in which the digital data of the color is known, means the color chart after color conversion processing is conducted by using the color chart.

Further, generally, because the human eyes have the discrimination ability which becomes low for the bright color or the dark color, when the digital data is regulated by the RGB and gradation is divided into 0–255 signals, in the color chart in which the digital data of the color is known, it is preferable that the range of the data of 0–100, and/or 200–255 is formed of signals having an interval which is wider than that of the other range.

Particularly, it is preferable that the range of the data of 0–00 and/or 200–255 is formed of signals having the interval of not smaller than 20 and the other range is formed of the signals having the interval of not larger than 15.

Similarly, in the color chart in which the digital data of the color is known, it is preferable that the digital data is regulated by the Lab, and the L value is the range of 0–100, the range of the value of 0–30 is formed of the value having the interval of not smaller than 10, and a value and/or b value is regulated by the range of −120–120, and the range is formed of the value having the interval of not smaller than 20.

Further, in the image processing, conventionally, the amount of the ink is limited only by the color, however, by the present inventor, it is found that bleeding is also an important factor in the textile-printing prints. For example, for the fabrics having the large ink absorptivity such as the canvas fabric, it is better that the maximum amount of the ink is set to a higher value, and the other hand, for the fabrics having the low ink absorptivity such as the silk fabric, it is better that the maximum amount of the ink is set to a lower value. Accordingly, when the information is inputted on the LUT, the textile printing in which is nearer the operator's desire, can be conducted. Concretely, the adjustment of the bleeding amount can be attained by limiting the maximum amount of the ink per a unit area. In this case, it is preferable that a function to limit the maximum amount of the ink according to the information from the host computer 20 is provided in the printer 40.

Figure 6:
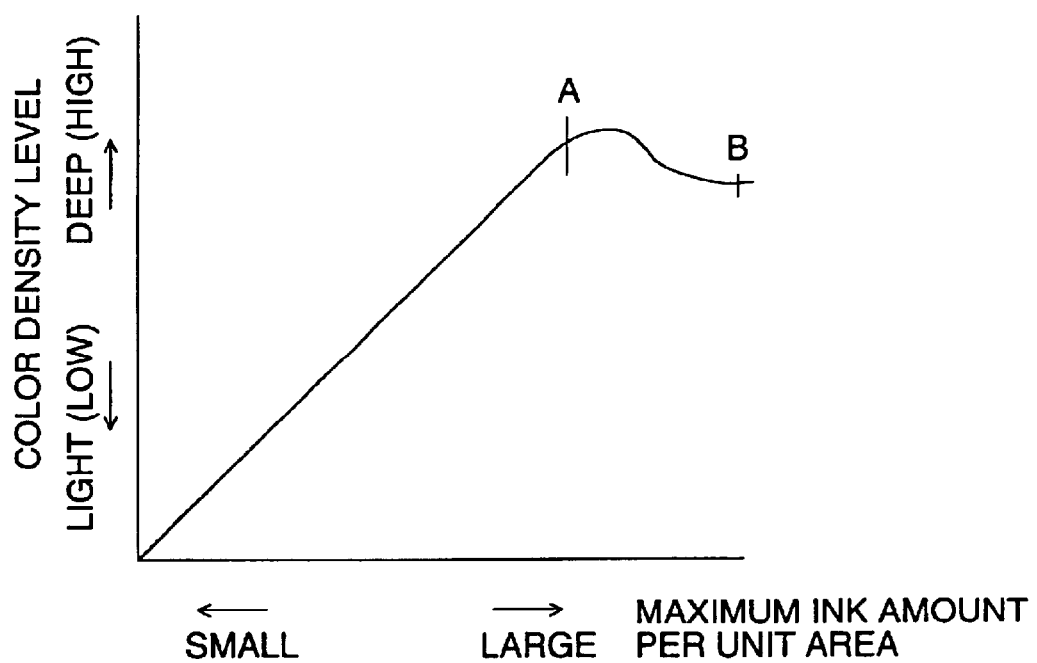
FIG. 6 is a view showing the relationship between an amount of ink and the color density.

According to the investigation of the present invention, it is found that the color density is not linearly deepen depending on the fabric as the maximum ink amount per a unit area is increased, and that the reversal of the color density occurs. Further, it is found that, in the amount of ink in which the color density is reversed, bleeding also occurs. That is, conventionally, the operator forecasts that the color density is increased when the amount of ink is increased, and in order to increase the density, the amount of ink is increased. However, actually, the color density is the point B, and the desired density can not be obtained. In the present embodiment, the feature is that the data to limit the maximum ink amount is inputted in the LUT itself. When it is explained by using FIG. 4, in the case where the colorimetric data of the portion of k=255, y=255, m=255, and c=255, at which the amount of ink is the maximum, is the point B in FIG. 6, and the calorimetric data of the portion of k=192, y=192, m=192, and c=192, which is in the same hue, is the point A in FIG. 6, when the LUT is generated, the LUT is generated by defining k=192, y=192, m=192, and C=192, as the maximum value, in that hue. According to this, the bleeding is reduced, and simultaneously, the reversal of the density to the amount of ink can also be reduced, thereby, the high quality textile printing can be conducted. Further, the operating efficiency of the operator is also increased.

Incidentally, it is also possible that the bleeding amount of the color patch is measured, for example, on the operator side, and is transmitted to the host computer side, and the appropriate bleeding amount is determined. Further, in the case where the maximum amount of the ink is adjusted, when ΔE value is not larger than 3 as compared to the case where the maximum amount of the ink is not adjusted, generally, it is preferable because there is no difference when it is viewed by the human eyes.

Further, in the present embodiment, when the ink whose density is different is used, the information relating to the switching point of the deep-colored ink and the light-colored ink can also be included in the LUT. According to the investigation of the present inventor, when the switching point of the deep-colored ink and the light-colored ink is changed, it is found that the coloring property is different for each kind of fabrics. Table 1 is a view showing the test result in the case where the switching point of the deep-colored ink and the light-colored ink is changed for each kind of fabrics.

TABLE 1

| | Kind of fabric | WARPS | WOOFS | Switching point | Continuity |
|---|---|---|---|---|---|
| Example 1 | DE-CHINE | 75d 172 STRINGS/ INCH | 75D 108 STRINGS/ INCH | Y = 170 M = 165 C = 170 K = 177 | Good |
| Example 2 | CANVAS | 20d 341 STRINGS/ INCH | 20D 337 STRINGS/ INCH | Y = 158 M = 159 C = 160 K = 158 | Good |
| Comparative Example | DE-CHINE | 75d 172 STRINGS/ INCH | 75D 108 STRINGS/ INCH | Y = 158 M = 159 C = 160 K = 158 | No Good |

In Table 1, the code in the column of WARPS shows the diameter and number of strings in one direction, and the code in the column of WOOFS shows the diameter and number of strings in the crossing direction in one direction, however, because these are well known to the skilled persons, details are not described below. Herein, as the result of comparison of Example 1 to Example-2, it is found that the continuity of the image becomes good by adjusting the switching point of the deep color and the light color in the same kind of fabric.

Incidentally, when the program to execute the above described method is recorded in the recording medium, the method can be executed in the other computer through such the recording medium. Further, the present invention is not limited to the inkjet system, but can be applied to all system in which the plurality kind of ink are mixed and the textile printing is conducted.

According to the present invention, the appropriate color conversion can be conducted on various fabrics, and for the original image to be printed, the color used in the original image can be formed with good reproducibility. Further, for the thick fabric or the thin fabric, a smooth image without bleeding can be formed by adjusting the maximum jetting amount.

What is claimed is:

1. A textile printing apparatus comprising:
   inputting means for inputting image data;
   a display to indicate an image based on the image data input by the inputting means;
   image processing means for applying image processing to the image data so as to make colors of the image indicated on the display close to desired colors;
   a printer to print the image on a fabric based on the image data applied with the image processing by the image processing means; and
   a memory to store a first color converting table to apply the first color converting processing and information to apply the converting processing;
   wherein the image processing means applies a first color converting processing to the image data input by the inputting means in accordance with a kind of fabric and indicates the image on the display based on the image data applied with the color converting processing,
   wherein the image processing means applies a converting processing to the image data applied with the image processing by the image processing means in accordance with the kind of fabric,
   wherein the image processing means applies the first color converting processing based on the first color converting table stored in the memory and applies the converting processing based on the information stored in the memory,
   wherein the information includes a least one of an ejecting amount of an ink, a mixing ratio of different color inks and information regarding a density level of an ink, corresponding to the kind of fabric, and
   wherein the printer prints the image on the fabric based on the image data applied with the converting processing.

2. A textile printing apparatus comprising:
   inputting means for inputting image data;
   a display to indicate an image based on the image data input by the inputting means;
   image processing means for applying image processing to the image data so as to make colors of the image indicated on the display close to desired colors;
   a printer to print the image on a fabric based on the image data applied with the image processing by the image processing means; and
   a memory to store a first color converting table to apply the first color converting processing and information to apply the converting processing, wherein the image processing means applies a first color converting processing to the image data input by the inputting means in accordance with a kind of fabric and indicates the image on the display based on the image data applied with the color converting processing, wherein the image processing means applies a converting processing to the image data applied with the image processing by the image processing means in accordance with the kind of fabric, wherein the image processing means applies the first color converting processing based on the first color converting table stored in the memory and applies the converting processing based on the information stored in the memory, wherein the printer prints the image on the fabric based on the image data applied with the converting processing, and wherein the memory stores the first color converting table for each kind of fabric.

3. A textile printing apparatus comprising:

inputting means for inputting image data;

a display to indicate an image based on the image data input by the inputting means;

image processing means for applying image processing to the image data so as to make colors of the image indicated on the display close to desired colors;

a printer to print the image on a fabric based on the image data applied with the image processing by the image processing means; and a memory to store a first color converting table to apply the first color converting processing and information to apply the converting processing, wherein the image processing means applies a first color converting processing to the image data input by the inputting means in accordance with a kind of fabric and indicates the image on the display based on the image data applied with the color converting processing, wherein the image processing means applies a converting processing to the image data applied with the image processing by the image processing means in accordance with the kind of fabric, wherein the image processing means applies the first color converting processing based on the first color converting table stored in the memory and applies the converting processing based on the information stored in the memory;

wherein the printer prints the image on the fabric based on the image data applied with the converting processing, and wherein the memory stores the second color converting table for each kind of fabric.

4. A textile printing apparatus comprising:

inputting means for inputting image data;

a display to indicate an image based on the image data input by the inputting means;

image processing means for applying image processing to the image data so as to make colors of the image indicated on the display close to desired colors;

a printer to print the image on a fabric based on the image data applied with the image Processing by the image processing means;

a memory to store a first color converting table to apply the first color converting processing and information to apply the converting processing;

transmitting means for transmitting color measurement data obtained by measuring color patch printed on the fabric by the printer; and receiving means for receiving the first color converting table to apply the first color converting processing and the information to apply the converting processing in accordance with the kind of fabric, wherein the image processing means applies the first color converting processing based on the first color converting table received by the receiving means and applies the converting processing based on the information received by the receiving means, wherein the image processing means applies a first color converting processing to the image data input by the inputting means in accordance with a kind of fabric and indicates the image on the display based on the image data applied with the color converting processing, wherein the image processing means applies a converting processing to the image data applied with the image processing by the image processing means in accordance with the kind of fabric, wherein the image processing means applies the first color converting processing based on the first color converting processing based on the first color converting table stored in the memory and applies the converting processing based on the information stored in the memory, wherein the printer prints the image on the fabric based on the information stored in the memory, wherein the printer prints the image on the fabric based on the image data applied with the converting processing, and wherein at least one of the receiving by the receiving means and the transmitting by the transmitting means is conducted by using a public communication line.

5. A textile printing data producing apparatus comprising:

receiving means for receiving data obtained by measuring colors of color patch formed by spraying plural different color, inks for fabric to be printed;

determining means for producing ink spraying data corresponding to a kind of fabric to be printed based on the received data; and transmitting means for transmitting the determined ink spraying data;

wherein at least one of the receiving by the receiving means and the transmitting by the transmitting means is conducted by using a public communication line.

6. A textile printing apparatus, comprising:

a receiver which receives image data;

a display which displays an image thereon based on the received image data;

an adjuster which adjusts the received image data to be sent to the display in order to change a displayed color on the display;

a converter which converts the adjusted image data into print image data to be used for print, wherein the converter has a converting table being provided according to a kind of a textile and having an information with respect to a maximum ink amount per a unit area of the textile; and a printer which prints an image on the textile based on the print image data converted by the converter.

* * * * *